J. HAMILTON.
RIM TIGHTENER FOR VEHICLE WHEELS.
APPLICATION FILED MAR. 24, 1908.
911,403.
Patented Feb. 2, 1909.
2 SHEETS—SHEET 1.
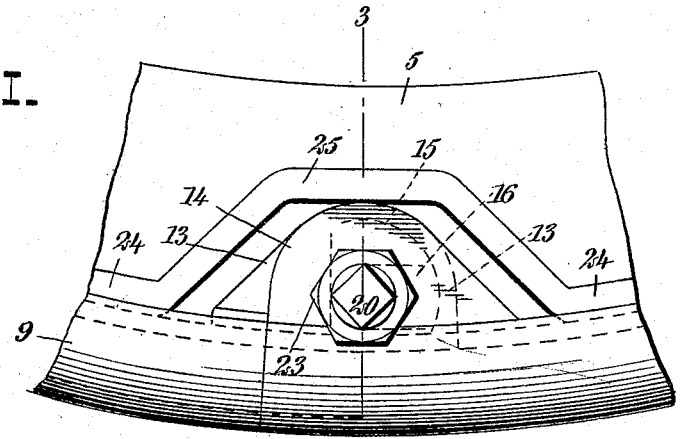
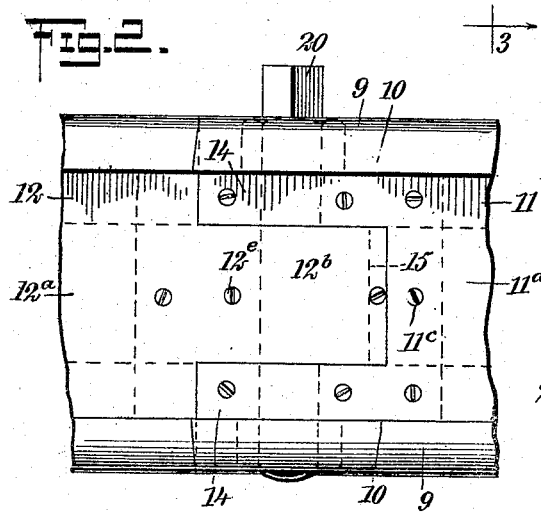
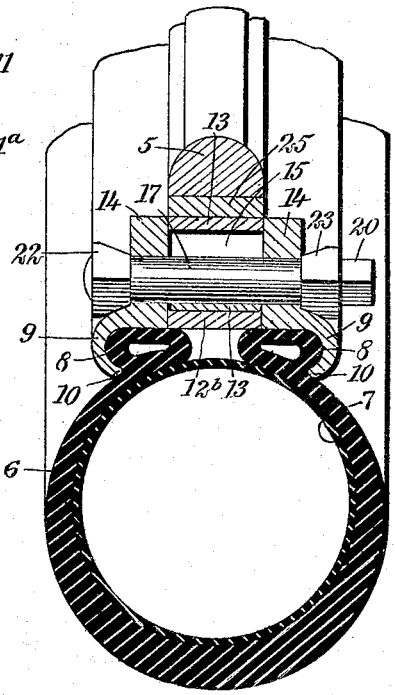
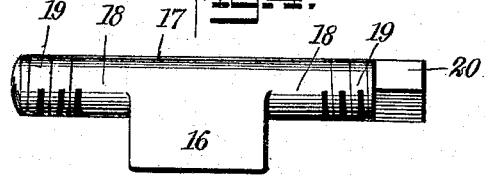
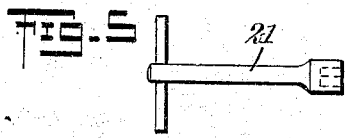
WITNESSES
G. Robert Thomas
Walton Harrison
INVENTOR
James Hamilton
BY Munn & Co
ATTORNEYS

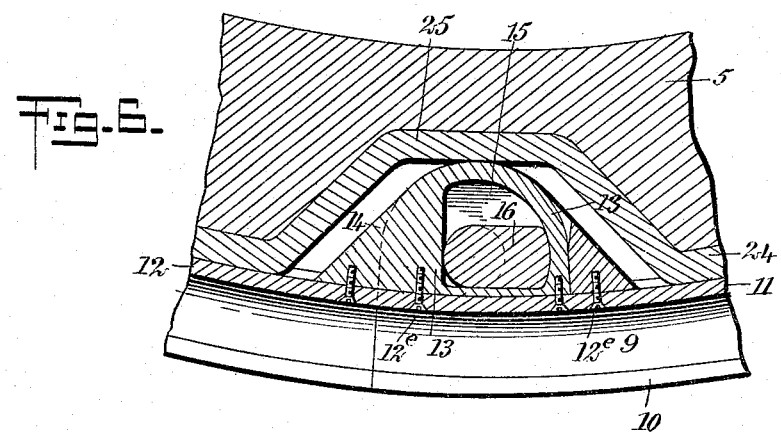
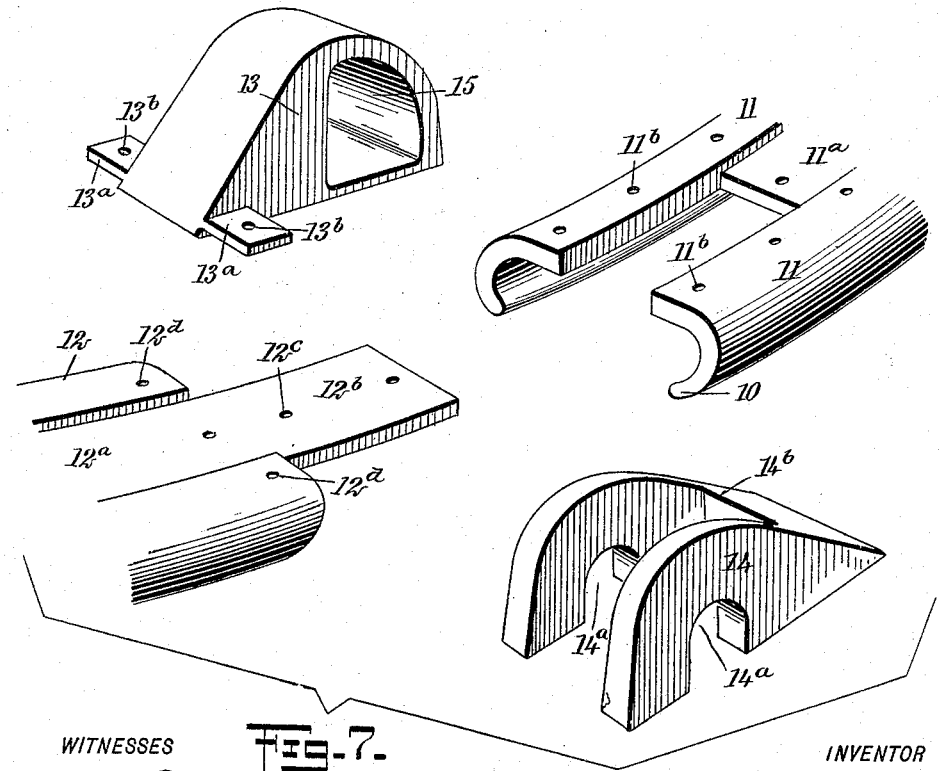

UNITED STATES PATENT OFFICE.

JAMES HAMILTON, OF WEIR, KANSAS.

RIM-TIGHTENER FOR VEHICLE-WHEELS.

No. 911,403.  Specification of Letters Patent.  Patented Feb. 2, 1909.

Application filed March 24, 1908. Serial No. 423,034.

*To all whom it may concern:*

Be it known that I, JAMES HAMILTON, a citizen of the United States, and a resident of Weir, in the county of Cherokee and State of Kansas, have invented a new and Improved Rim-Tightener for Vehicle-Wheels, of which the following is a full, clear, and exact description.

My invention relates to vehicle wheels and comprises more particularly an improved means for tightening the rims of the wheels.

While my invention admits of general use, it is of peculiar service in relation to wheels used for automobiles, bicycles and similar road vehicles provided with cushion, pneumatic or other resilient tires. My invention also has special application to vehicle wheels provided with iron tires and adapted to be fitted with rims carrying cushion or pneumatic tires.

More specifically stated, my invention comprehends means for securing together the abutting ends of the rim and for moving these ends relatively to each other for the purpose of tightening and loosening the rim in order to facilitate its removal, replacement, or its fitting while in position.

Reference is to be had to the accompanying drawings forming a part of this specification, in which similar characters of reference indicate corresponding parts in all the figures.

Figure 1 is a fragmentary side elevation showing the felly of a vehicle wheel provided with an iron tire, the latter carrying a rim provided with my improved rim tightener and adapted to carry a pneumatic tire (not shown), the view showing in dotted lines the cam mechanism whereby the rim is tightened or loosened at will; Fig. 2 is a fragmentary inverted plan showing how the joining ends of the rim are fitted relatively to each other and are controllable by the cam which is mounted upon a stub shaft revoluble within certain limits by aid of its angular end; Fig. 3 is a substantially vertical central cross section on the line 3—3 of Fig. 1, looking toward the right of said view and showing the cam and its accompanying parts for drawing the ends of the rim together and for releasing the same, and also showing the pneumatic tire; Fig. 4 is a detail plan of the cam and its shaft removed from their mountings; Fig. 5 is a reduced plan view showing the socket wrench to be used for turning the shaft; Fig. 6 is a fragmentary section taken upon a plane cutting through the felly, tire, rim and locking device, this section being taken upon a plane coinciding with the general plane of the wheel; and Fig. 7 is a fragmentary perspective showing the ends of the rim and portions of the locking device, all segregated and ready for assembling.

At 5 is shown the felly of the wheel and at 6 is shown a pneumatic tire provided with an inner tube 7, and further provided with a pair of flanges 8, each of general annular form. These flanges are engaged by a pair of oppositely disposed metallic flanges 9, the outer edges 10 of which are cupped slightly toward each other in order to secure the flanges 8 and thus hold the tire 6 firmly in position.

The ends of the rim are shown at 11, 12, and are to be secured together by aid of my device. The ends 11, 12 of the rim, as shown in Fig. 7, are provided with the bottom portions $11^a$, $12^a$ of a channel which extends throughout the entire length of the rim, and consequently is of a general annular form. This channel is provided for the purpose of fitting the rim over a metallic tire 24, as hereinafter described. The end 12 is further provided with a tongue $12^b$ which is virtually a continuation of the bottom portion $12^a$ of the channel. This tongue and also the bottom portion $12^a$ of the channel are provided with holes $12^c$, and other holes $12^d$ are disposed in the end 12 upon opposite sides of the portion $12^a$ of the channel. The end 11 is provided with holes $11^b$.

At 13 is a box provided with lugs $13^a$ integral therewith and extending in opposite directions therefrom, these lugs being provided with screw holes $13^b$. The box 13 is provided with an opening 15 extending entirely through it and having substantially the shape of a quarter-cylinder, as will be understood from Figs. 6 and 7. A fork 14 is provided with bearings $14^a$ and is further provided with a slot $14^b$, the latter being large enough to receive the box 13. The fork 14 and box 13 being of the conformity shown more particularly in Fig. 7, may be fitted neatly together, the box 13 being free to move in and out of the slot $14^b$.

By aid of screws $12^e$, extending through the holes $12^c$, $12^d$, the box 13 is secured firmly in position upon the end 12, the lugs $13^a$ overlapping small portions of the end 12 disposed upon opposite sides of the portion $12^a$ of the channel. Similarly, by aid of screws $11^c$, the fork 14 is mounted upon the end 11, the box 13 and the fork 14 being in such relation, that when the ends 11, 12 of the rim are brought together, the box 13 moves into the slot $14^b$. The bearings $14^a$ are for the purpose of accommodating a cam shaft 17 (see Fig. 4). The cam shaft is, for this purpose, provided with smooth portions 18 serving as journal necks and fitting into the bearings $14^a$. The shaft 17 is further provided with threaded portions 19 and with an angular end 20. A socket wrench 21 may be fitted upon this angular end for the purpose of turning the shaft 17. Integral with this shaft is a cam 16 which fits neatly within the opening 15, as will be understood from Fig. 6. The shaft 17 carrying its cam 16 is placed within the opening 15 and fitted relatively to the fork 14 before the box 13 and the fork 14 are secured upon the ends of the rim. Revoluble nuts 22, 23, each having a frusto-pyramidal form, are fitted upon the threaded portions 19 of the shaft 17 and serve to adjust this shaft and to hold it securely in position.

When the several parts shown in Fig. 7, and the shaft 17 carrying the cam 16 and shown in Fig. 4, are assembled as indicated in Fig. 1, the construction may be summarized by stating that the ends of the rim overlap each other, and that one of these ends is provided with a cam which engages the portion carried by the other end of the rim.

While I show the box 13 and fork 14 as separated upon the ends upon which they are mounted, it will be understood that I do not limit myself to this exact construction.

The metallic tire 24 is provided with a portion 25 bent inwardly for the purpose of accommodating the projecting portions 13, 14 of the rim.

My invention is used as follows: The parts being assembled as above described, the operator applies the socket wrench 21 to the angular portion 20 of the stub shaft 17 and turns this shaft within the limits prescribed. In doing this, the cam 16, playing within the opening 15, forces the box 13 to the right or left, according to the direction of rotation of the shaft, and thus draws the ends of the rim toward each other, or forces them apart, as the case may be.

My device above described enables the rim to be fitted upon the tire 24 so as to slightly overhang the opposite edges of the latter, and thus alleviate or remove all danger of its being removed accidentally. Owing, however, to the fact that the tire 24 can not be placed in position unless the rim can be made of variable diameter, my device provides for changing the diameter, as hereinbefore described.

Having thus described my invention, I claim as new and desire to secure by Letters Patent:

1. In a rim tightener, the combination of a rim provided with ends and with enlarged portions adjacent to said ends, said enlarged portion of one end overlapping the enlarged portion of the other end, one of said enlarged portions being provided with an opening, a cam shaft revolubly mounted upon the other of said enlarged portions and extending through said opening, and a cam member mounted upon said shaft within said opening.

2. In a rim tightener, the combination of a rim provided with ends, one of said ends having a central projecting portion and the other of said ends having a pair of projecting portions disposed upon opposite sides of said first-mentioned projecting portion, a cam shaft extending through all of said projecting portions, and a cam mounted upon said cam shaft for the purpose of moving one of said projecting portions relatively to the other, said cam shaft being provided with means whereby it may be turned.

3. The combination of a rim provided with ends to be secured together, one of said ends having an opening, the other of said ends being provided with enlarged projecting portions and disposed upon opposite sides of said first-mentioned projecting portion, a shaft extending through all of said projecting portions, a cam mounted upon said shaft within said opening for the purpose of moving said projecting portions relatively to each other, and a tire engaging said rim, said tire being provided with a portion bent inwardly in order to make room for said enlarged portions of said rim.

4. The combination of a rim provided with portions movable relatively toward each other, a box mounted upon one of said portions and provided with an opening, a fork mounted upon the opposite portion and provided with a slot adapted to receive said box, a shaft journaled within said fork and extending through said box, said shaft being provided with a cam for moving said box relatively to said shaft, and means for turning said cam.

5. The combination of a rim provided with terminal portions movable relatively toward each other, a box made separately from said rim and secured to one of said portions, said box being provided with an opening, a fork made separately from said rim and secured firmly to the other of said portions, a shaft journaled within said fork and extending through the opening in said box, said shaft being provided with a cam for moving said box relatively to said fork, and means controllable at will for turning said shaft.

In testimony whereof I have signed my name to this specification in the presence of two subscribing witnesses.

JAMES HAMILTON.

Witnesses:
WALTON HARRISON,
JOHN P. DAVIS.